J. B. GLENNON

INDICATOR

May 16, 1933. Re. 18,830

Original Filed May 28, 1930 3 Sheets-Sheet 1

Inventor
James B. Glennon,
By Ogle R. Singleton,
Attorney

J. B. GLENNON

May 16, 1933. INDICATOR Re. 18,830

Original Filed May 28, 1930 3 Sheets-Sheet 2

Inventor
James B. Glennon,
By Ogle R. Singleton,
Attorney

J. B. GLENNON

May 16, 1933. INDICATOR Re. 18,830

Original Filed May 28, 1930 3 Sheets-Sheet 3

James B. Glennon, Inventor

By Ogle R. Singleton,

Attorney

Reissued May 16, 1933 Re. 18,830

UNITED STATES PATENT OFFICE

JAMES B. GLENNON, OF SAN DIEGO, CALIFORNIA, ASSIGNOR, BY MESNE ASSIGNMENTS, TO LEWIS R. SMITH, RECEIVER OF APCO MOSSBERG CORPORATION, A CORPORATION OF RHODE ISLAND

INDICATOR

Original No. 1,809,934, dated June 16, 1931, Serial No. 456,591, filed May 28, 1930. Application for reissue filed February 17, 1933. Serial No. 658,385.

My invention consists in a new and useful improvement in indicators for facilitating the steering of automobiles into parking spaces parallel with the street curbs. The device embodying my invention comprises an indicator placed upon the instrument board of the automobile where it is readily observable by the driver, and having one pointer which is moved to and fro by the movement of the wheels of the automobile and a second pointer which is moved to and fro by the movement of the steering wheel of the automobile. My device is so designed that it is put into operation only when the automobile is in the initial position for the process of parking it parallel with a curb, and the device becomes inoperative automatically when the parking process has been completed.

My device is intended to serve as a means for solving the problem of steering a car into a limited parking space between two other cars already parked parallel with the curb, a situation often confronting a driver desiring to park his car in an area of congestion. To park a car in such a limited space, the driver must place his car parallel with the car forward of the vacant space, and then back his car into the space. To perform this maneuver most efficiently requires the determination of the most advantageous angle of approach for the car to the vacant space when the car is being backed. It is obvious that this angle depends upon the length of the car and its position relative to the parked car, at the beginning of the parking process. Under the ordinary practice of this process of parking this angle is determined by the "trial and error" method, the driver placing his car at approximately the most desirable position and guessing at the most desirable angle for backing. By such "hit and miss" practice, the success of the maneuver is extremely doubtful. The use of my device is designed to indicate to the driver the proper intial position and the most desirable angle by which to back into the space, and also the proper manipulation of the steering wheel to complete the process by bringing the car to a position parallel with the curb.

When using my device, the driver places his car parallel with the curb and so related to the car in front of the vacant space that as the driver sits at his steering wheel he is opposite the rear bumper of the parked car. He then puts my device into operation, continues to drive forward on the same course, and my device then indicates the proper point for the driver to stop and begin backing. This indication is given by the pointer which is actuated by the wheels of the car, the position of this pointer showing when the rear wheels are in the most advantageous position for the beginning of the rearward movement. When the car is backed, this pointer moves to a certain position in my indicator, and when the driver by turning the steering wheel moves the second pointer to coincide with the first pointer, the front wheels of the car are in the proper position to cause the car to move rearwardly into the space.

A particular advantage of my device is the fact that the objectionable feature of having to change the direction of the front wheels by turning the steering wheel while the car is not moving is eliminated, since when using my device the direction of the front wheels is changed while the car is moving.

In the drawings filed herewith and the detailed description of the construction therein illustrated, I have shown one specific embodiment of my invention, but it is to be distinctly understood that I do not consider my invention limited to said specific embodiment, but refer for its scope to the claims appended hereto.

In the drawings:

Fig. 4 is an enlarged section of a detail on the line 4—4 of Fig. 1; and

Figure 1:
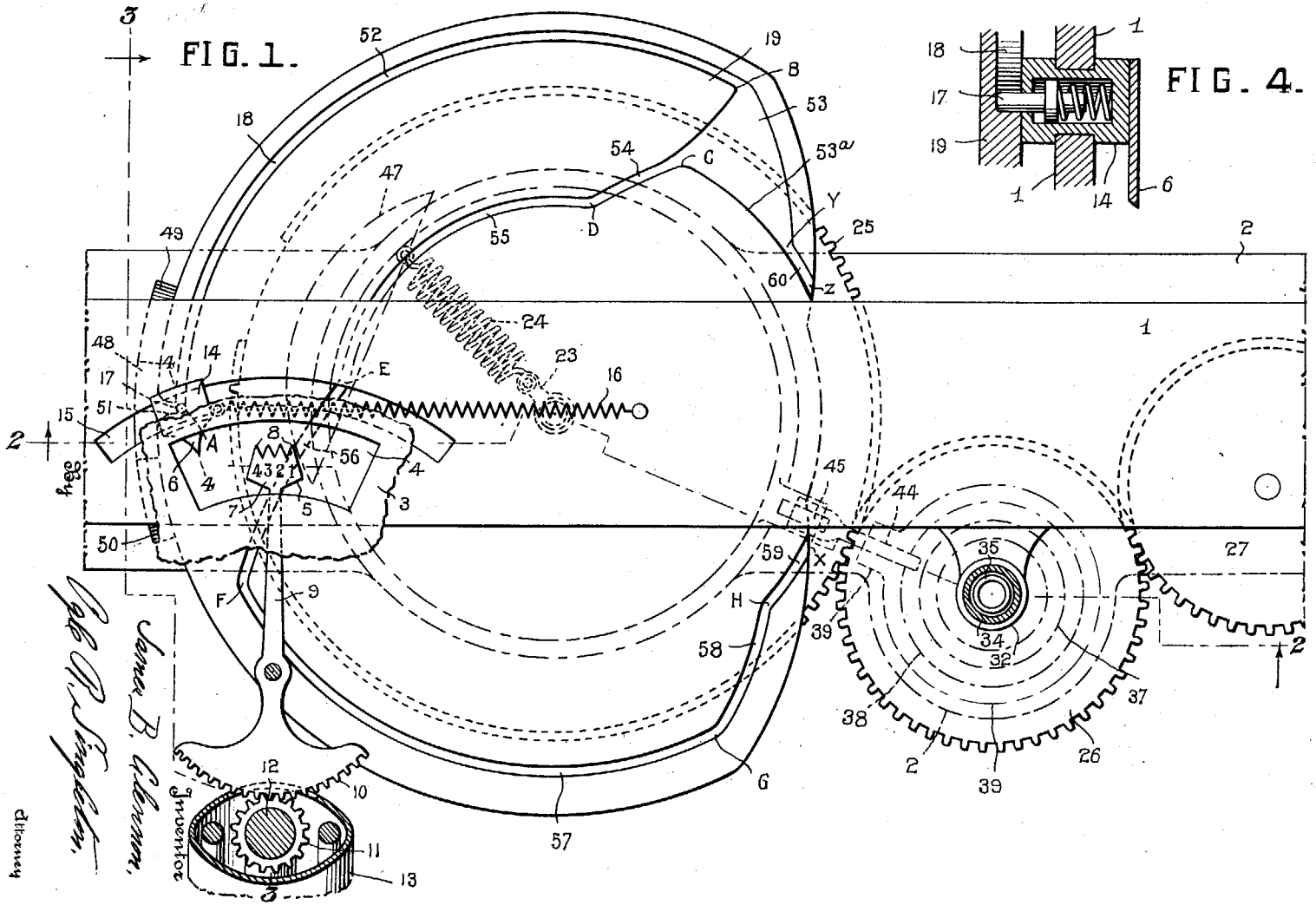
Fig. 1 is a vertical section of the line 1—1 of Fig. 3.
Figure 2:
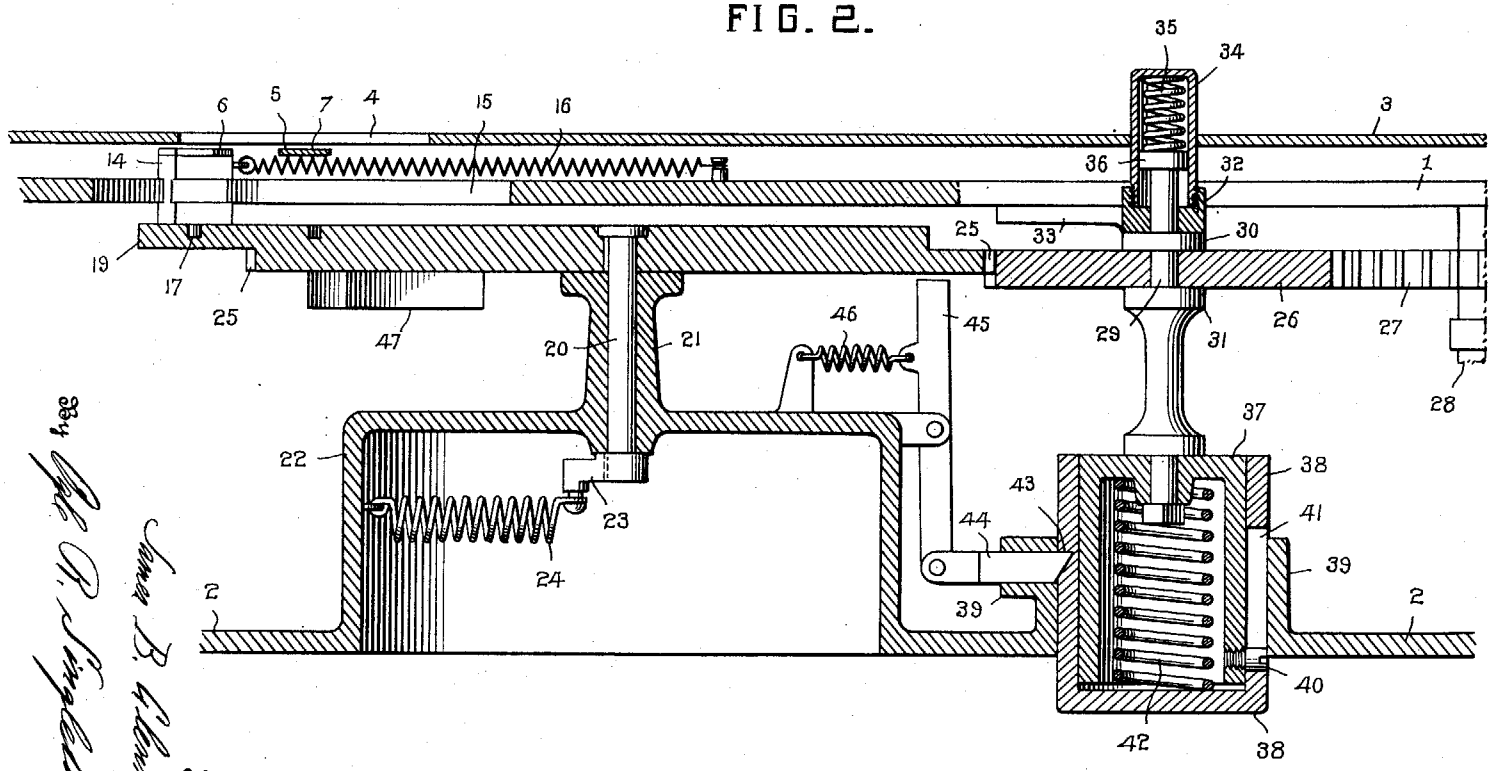
Fig. 2 is a horizontal section on the line 2—2 of Fig. 1.

In the embodiment of my device illustrated in the drawings, I provide two plates 1 and 2 suitably mounted behind the instrument board 3 of the automobile which is provided with a suitable arcuate window 4 through which the indicators 5 and 6 of my device may be observed. The indicator 5 consists of a serrated plate 7 having the four pointers 8, mounted upon a stem 9 suitably pivoted on the instrument board 3 and having a segmental rack 10 meshing with a pinion 11 on the shaft 12 of the steering post 13 of the automobile. It is to be understood that the indicator 5 is so related to the steering gear of the automobile that the angular disposition of the steering or front wheels of the automobile is indicated by the position of the indicator 5 in the window 4.

The indicator 6 is mounted upon a sliding block 14 suitably mounted in an arcuate slot 15 in the plate 1, so disposed as to permit the block 14 to move the indicator 6 across the window 4. The block 14 is provided with a spring 16 suitably mounted on the plate 1, which tends to draw the block 14 toward the right end of the slot 15. The block 14 is provided with a spring-pressed cam pin 17 received in the cam slot 18 of the rotatable disc 19 on the shaft 20 in the journal 21 of the cylindrical enlargement 22 of the plate 2. The shaft 20 has a crank arm 23 to which is attached the spring 24 fastened to the enlargement 22 and designed to return the disc 19 to normal position. The disc 19 has the gear 25 which may be driven through the clutch gear 26 by the driving gear 27 connected by any suitable form of drive 28 with the traction wheels of the automobile. The clutch gear 26 is loosely mounted upon the rod 29 between the thrust collars 30 and 31. The rod 29 is carried in the journal 32 on the bracket 33 from the plate 1. Threaded to this journal 32 and surrounding the upper end of the rod 29, I provide a cap 34 in which is mounted a spring 35 pressing upon the head 36 of the rod 29. The rod 29 is provided at its opposite end with a thimble 37 received in a cup 38 slidably carried in a collar 39 formed in the plate 2. I provide a pin 40 projecting from the thimble 37 into the slot 41 in the cup 38 and a coil spring 42 in the thimble 37 pressing against the cup 38. The end of the cup 38 projects beyond the plate 2 and forms the operating button for the mechanism, as will be presently explained. The cup 38 is provided with a notch 43 for the latch 44 slidable in the collar 39 and actuated by the trigger 45 pivotally mounted on the enlargement 22 and having the spring 46 to hold the latch 44 in locking position. I provide a cam 47 on the disc 19 to operate the trigger 45 to cause the latch 44 to release the cup 38 to allow the spring 42 to eject the cup 38 in the collar 39 and permit the spring 35 to move the rod 29 so as to cause the clutch gear 26 to move out of mesh with the driving gear 27.

It is obvious from the foregoing description of the details of construction that when the disc 19 is rotated by its associated driving means, the pin 17 being engaged in the slot 18 of the disc 19 and the block 14 being under the influence of the spring 16 which tends to draw the block 14 toward the center of the disc 19, the indicator 6 will oscillate in the window 4, its movement being determined by the disposition of the slot 18 on the disc 19. It is obvious that the action of the spring 16 on the block 14 causes the pin 17, when it is engaged in the slot 18, to hug the wall of the slot 18 which is toward the center of the disc 19.

The disc 19 has an off-set ledge 48, the top of which coincides with the plane of the bottom of the slot 18, and there are two inclined planes 49 and 50, one on each side of the ledge 48. The throat 51 of the slot 18 is located adjacent the ledge 48. The portion 52 of the slot 18, extending clockwise from the point marked "A" (Fig. 1) to the point marked "B", describes an arc concentric with the disc 19. Between the points marked "B", "C" and "Y", the slot 18 has an enlarged triangular open space 53, the wall 53—*a* of this open space 53, toward the center of the disc 19, extending clockwise from the point marked "C" to the point marked "Y", and describing an arc concentric with the disc 19. The portion 54 of the slot 18, extending counter-clockwise from the point marked "C" to the point marked "D", inclines toward the center of the disc 19. The portion 55 of the slot 18, extending counter-clockwise from the point marked "D" to the point marked "E", describes an arc concentric with the disc 19. The portion 56 of the slot 18, extending counter-clockwise from the point marked "E" to the point marked "F", inclines away from the center of the disc 19. The portion 57 of the slot 18, extending from the point marked "F" to the point marked "G", describes an arc concentric with the disc 19. The portion 58 of the slot 18, extending counter-clockwise from the point marked "G" to the point marked "H", inclines toward the center of the disc 19. The portion 59 of the slot 18, extending counter-clockwise from the point marked "H" to the point marked "X", describes an arc concentric with the disc 19. At the point marked "X", the slot 18 opens through the periphery of the disc 19. The portion 60 of the slot 18, extending clockwise from the point marked "Y" to the point marked "Z", describes an arc concentric with the disc 19 and forms a continuation of the wall 53—*a* to the point marked "Z" where the slot 18 opens through the periphery of the disc 19.

Figures 3, 5:
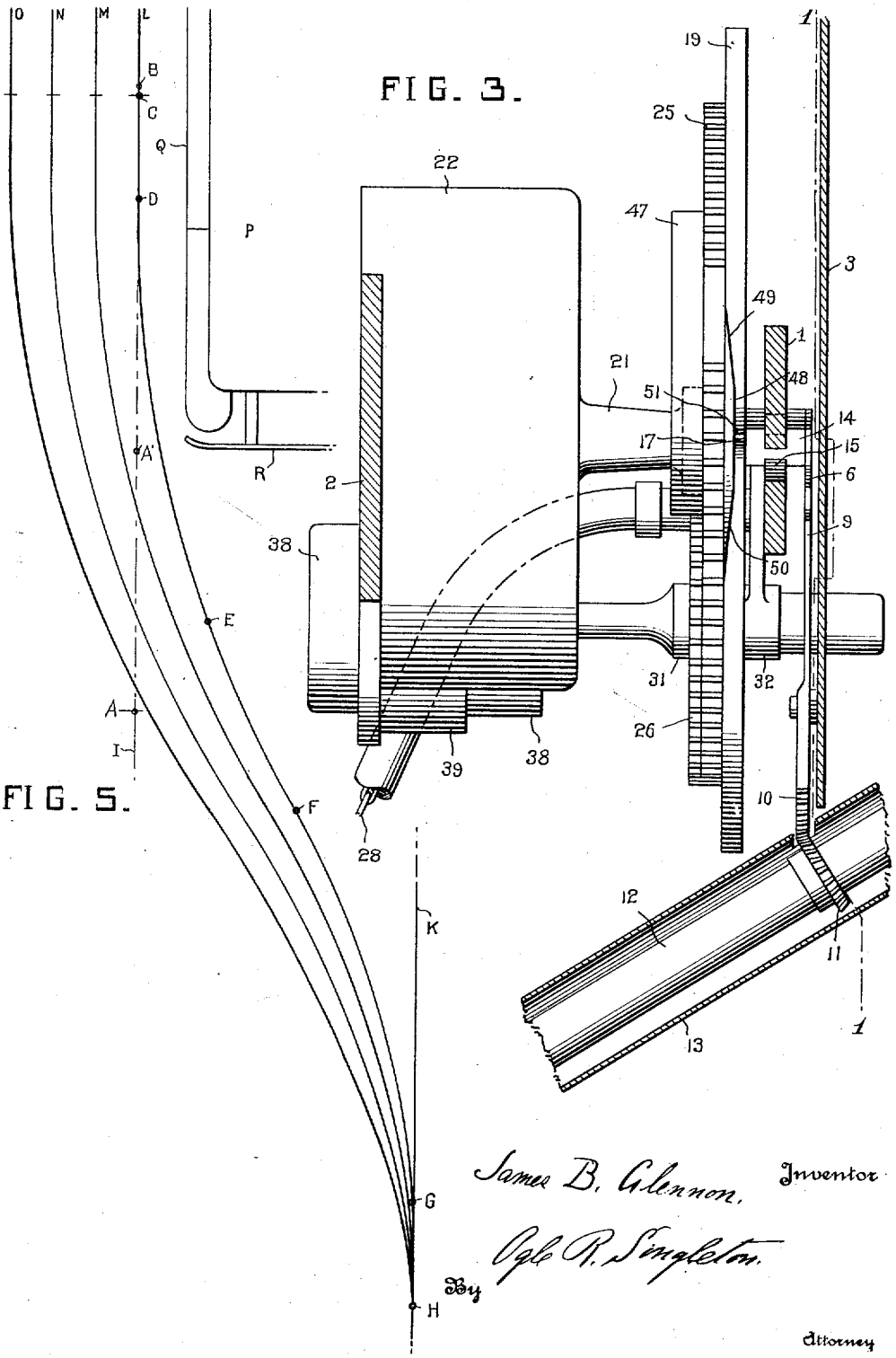
Fig. 3 is a side elevation on the line 3—3 of Fig. 1.
Fig. 5 is a diagrammatic view, indicating the lines of travel of the rear wheels of the automobile when my device is in use.

From the foregoing description of the details of construction of my device, its operation will be obvious. As indicated diagrammatically in Fig. 5, the driver placing his car on the line "I" parallel with the curb "K", proceed forward until he is opposite the rear end "R" of the car "P". This is indicated on the line "I" by the circle marked "A" (Fig. 5). As previously explained, my device is then put into operation. At that time, the rear axle of the car is at the point indicated on the line "I" by the circle marked "A" (Fig. 5), and it is to be noted that the disc 19 being in normal position is so disposed that the pin 17 is at the point marked "A" on the slot 18 (Fig. 1).

My device is put into operation by the driver pushing the cup 38 until it is locked by the catch 44, causing the spring 42 to move the rod 29 against the spring 35 to carry the clutch gear 26 into engagement with the driving gear 27 and the driven gear 25, thus transmitting motion to the disc 19. It is to be noted that the gears 26 and 27 are greater in width than the gear 25, so that the clutch gear 26, as it moves, first engages the gear 27 and then the gear 25.

The car proceeds forward until the rear axle reaches the point indicated by the circle marked "B" (Fig. 5), at which time the movement counter-clockwise of the disc 19, determined by the distance travelled by the wheels of the car which drive the disc 19, has brought the point marked "B" on the slot 18 to the pin 17, at which point the pin 17 passes off of the inner side of the slot 18. The spring 16 causes the block 14 to move across the window 4, the pin 17 being stopped by the wall 53—*a*. The indicator 6 is thus brought to the middle of the window 4, which is the signal for the driver to stop and begin backing the car.

It is to be noted that should the driver continue to drive the car forward, the disc 19 will continue to rotate counter-clockwise, the pin 17 hugging the wall 53—*a* until it passes through the portion 60 of the slot 18, and at the point "Z" passes out and contacts the periphery of the disc 19. Should this occur, the disc 19 will have rotated to such a point that the cam 47 will trip the trigger 45, thus releasing the disc 19 which will be returned to normal position by the action of the spring 24. The action of the trigger 45 will also return the cup 38 to normal position. When the disc 19 is rotated clockwise by the action of the spring 24, the inclined plane 49 passing under the pin 17 raises it onto the ledge 48 opposite the throat 51 and by the action of the spring 16 the pin 17 is moved to the point marked "A", again in normal position. It will be seen, therefore, that should the driver continue to move the car forward beyond the point marked "B" (Fig. 5) a sufficiently long distance, my device will become automatically inoperative, and the parts will be restored to normal position, ready to repeat their operation.

However, should the car not move forward a sufficient distance to cause the disc 19 to rotate far enough to cause the pin 17 to pass out of the portion 60, the device is in condition for the next step of the process. In other words should the driver, continue to move forward a short distance, the pin 17 will continue to hug the wall 53—*a* as it passes the pin 17. It is obvious that when the driver, reversing the movement of the car, begins to back, the disc 19 will be driven clockwise, the wall 53—*a* moving in the opposite direction past the pin 17. Therefore, should there have been any movement of the car forward, after the pin 17 came into contact with the wall 53—*a*, this is now compensated by the corresponding rearward movement of the car.

The point "C" (Fig. 1) is then brought to the pin 17 which now enters the portion 54 of the slot 18. At this time the rear axle of the car has reached the point indicated by the circle marked "C" (Fig. 5). As the portion 54 passes the pin 17, the indicator 6 is moved, by the spring 16, toward the right side of the window 4, the point "D" (Fig. 1) is brought to the pin 17, and the rear axle has reached the point indicated by the circle marked "D" (Fig. 5). The beginning of the movement of the indicator 6 from the middle of the window 4 toward the right of the window 4 is the signal to the driver to adjust the front wheels of the car so as to cause the car to assume the proper angle for backing into the parking space. The driver makes the correct adjustment of the front wheels by turning the steering wheel, causing movement of the indicator 5, so that one of the points 8 on the indicator 5 coincides with the position of the indicator 6.

It is to be noted that in Fig. 5 there are illustrated the lines "L", "M", "N" and "O", indicating the distances one foot, two feet, three feet and four feet, respectively, between the left edge "Q" of the parked car "P" and the right edge of the driver's car. If the driver, in placing his car in the initial position for the parking process was on the line "L", that is to say he found his car one foot from the car "P", he then causes the point 8 designated by the numeral "1" on the plate 7 to coincide with the point of the indicator 6. If, however, when the driver had placed his car in the initial position he had found that it was on the line "M", he causes the point 8 designated by the numeral "2" to coincide with the point of the indicator 6, and so for the lines "N" and "O", and the points 8 designated as "3" and "4".

The continued backing of the car, as the rear axle moves from the point indicated by the circle marked "D" to the point indicated by the circle marked "E" (Fig. 5), causes the disc 19 to rotate clockwise moving the portion 55 of the slot 18 past the pin 17 until the point "E" (Fig. 1) reaches the pin 17. During the period when the pin 17 is in the portion 55 of the slot 18, both indicators 5 and 6 are maintained in the same position, and the car moves rearwardly on the desired curve.

Further rotation of the disc 19 moves the portion 56 of the slot 18 past the pin 17, causing the indicator 6 to move across the window 4 to the middle and then to the left side of the window 4. As the pointer 6 is thus moved, the driver by manipulating the steering wheel moves the indicator 5 to correspond with the movement of the indicator 6, and thus secures the proper change of the front wheels, to cause the car to turn toward a position parallel with the curb "K."

When the rear axle has reached the point indicated by the circle marked "F" (Fig. 5), the point marked "F" (Fig. 1) has reached the pin 17, and the portion 57 of the slot 18 then passes the pin 17, during the passage of which the indicators 5 and 6 are maintained in the same position, and the car moves rearwardly on the desired curve, until the rear axle reaches the point indicated by the circle marked "G" (Fig. 5), and the point marked "G" (Fig. 1) reaches the pin 17. Then the portion 58 of the slot 18 passing the pin 17 causes the indicator 6 to move to the middle of the window 4, the driver manipulating the steering wheel to cause the indicator 5 to correspond with the indicator 6, thus securing the proper change of the front wheels to cause the car to assume a position parallel with the curb "K", when the rear axle reaches the point indicated by the circle marked "H" (Fig. 5), and the point marked "H" (Fig. 1) reaches the pin 17.

Further backing of the car for a relatively short distance, causes the portion 59 of the slot 18 to pass the pin 17, and when the point "X" reaches the pin 17, the pin 17 passes out and contacts the periphery of the disc 19. When this occurs, the disc 19 will have moved to such a point that the cam 47 will trip the trigger 45, thus releasing the disc 19 which will be returned to normal position by the action of the spring 24, the inclined plane 50 passing under the pin 17, raising it onto the ledge 48 opposite the throat 51, and by action of the spring 16, the pin 17 is moved to the point marked "A", again in normal position.

Having described my invention, what I claim is:

1. In an indicator for a dirigible vehicle, the combination of an indicating medium operated by the means for steering the vehicle; and an indicating medium operated by a mechanical element of the vehicle in contact with the surface supporting the vehicle, the two indicating media being so related that by the operation of the means for steering the vehicle, the movements of the two media may be caused to coincide.

2. In an indicator for a dirigible vehicle, the combination of an indicating element operated by the means for steering the vehicle; and an indicating element operated by the tractive means of the vehicle, the two indicating elements being so related that, by the operation of the means for steering, the movements of the two elements may be caused to coincide.

3. In an indicator for an automobile, the combination of an indicating element; means actuated by the steering wheel of the automobile and adapted to operate said element; a second indicating element; and means actuated by the wheels of the automobile and adapted to operate said second element, the two indicating elements being so related that, by the operation of the steering wheel, the movements of the two elements may be caused to coincide.

4. In an indicator for an automobile, the combination of a movable pointer; means for moving said pointer from the steering wheel of the automobile whereby the position of the pointer corresponds with the position of the front wheels of the automobile; a movable indicator; and means operated by the wheels of the automobile adapted to position the indicator to indicate the various positions into which the pointer must be moved by the operation of the steering wheel to secure the proper position of the front wheels to move the car in the desired manner.

5. In an indicator for an automobile, the combination of a pointer mounted to move in an arc; a connection between said pointer and the steering wheel of the automobile whereby the position of the pointer indicates the position of the front wheels of the automobile; an indicator adapted to move in an arc concentric with the arc of movement of the pointer; means operated by the wheels of the automobile adapted to position the indicator at a definite point on the arc of its movement at each stage in the desired movement of the automobile, to indicate the position at which the pointer must be positioned on its arc of movement by the operation of the steering wheel to secure the proper position of the front wheels of the automobile at each stage in the desired movement of the automobile.

6. In a device for indicating the course of travel of an automobile to be parked in a limited amount of parking space parallel with a street curb, the combination of an observation window disposed upon the instrument board of the automobile; a plate behind said window and provided with a slot; a block slidably mounted in said slot; a pointer on said block, the window, slot, block and pointer being so related that the movement of the pointer can be observed through the window when the block slides in the slot; a spring-pressed pin on said block; a rotatable disc mounted adjacent said plate and having a sinuous cam shoulder with which said pin engages; a spring mounted on said plate and said block adapted to cause said pin to engage said shoulder; means driven by the wheels of the automobile adapted to rotate said disc; a second pointer pivotally mounted adjacent said window and so disposed as to be movable in unison with said first pointer; and means operated by the steering wheel of the automobile and adapted to move said second pointer.

7. In an indicator for an automobile, the combination of an indicating element; means actuated by the steering wheel of the automobile and adapted to operate said element; a second indicating element; and means actuated by the propulsive mechanism of the automobile and adapted to operate said second element, the two indicating elements being so related that, by the operation of the steering wheel, the movements of the two elements may be caused to coincide.

8. In an indicator for an automobile, the combination of a movable pointer; means for moving said pointer from the steering wheel of the automobile whereby the position of the pointer corresponds with the position of the front wheels of the automobile; a movable indicator; and means operated by the propulsive mechanism of the automobile, and adapted to position the indicator to indicate the various positions into which the pointer must be moved by the operation of the steering wheel to secure the proper position of the front wheels of the automobile to move the automobile in the desired manner.

9. In an indicator for an automobile, the combination of a pointer mounted to move in an arc; a connection between said pointer and the steering wheel of the automobile whereby the position of the pointer indicates the position of the front wheels of the automobile; an indicator adapted to move in an arc concentric with the arc of movement of the pointer; means operated by the propulsive mechanism of the automobile and adapted to position the indicator at a definite point on the arc of its movement at each stage in the desired movement of the automobile, to indicate the position at which the pointer must be positioned on its arc of movement by the operation of the steering wheel to secure the proper position of the front wheels of the automobile at each stage in the desired movement of the automobile.

10. In a device for indicating the course of travel of an automobile to be parked in a limited amount of parking space parallel with a street curb, the combination of an observation window disposed upon the instrument board of the automobile; a plate behind said window and provided with a slot; a block slidably mounted in said slot; a pointer on said block, the window slot, block and pointer being so related that the movement of the pointer can be observed through the window when the block slides in the slot; a spring-pressed pin on said block; a rotatable disc mounted adjacent said plate and having a sinuous cam shoulder with which said pin engages; a spring mounted on said plate and said block adapted to cause said pin to engage said shoulder; means driven by the propulsive mechanism of the automobile and adapted to rotate said disc; a second pointer pivotally mounted adjacent said window and so disposed as to be movable in unison with said first pointer; and means operated by the steering wheel of the automobile and adapted to move said second pointer.

11. In a device for indicating the course of travel of an automobile, the combination of an observation window; a plate behind said window and provided with a slot; a rotatable disc mounted adjacent said plate and having thereon an indicating medium; means driven by the wheels of the automobile adapted to rotate said disc, the parts being so related that the movement of the disc displays the indicating medium thereon through said slot and window; a pointer pivotally mounted adjacent said window and so disposed as to be movable in unison with said indicating medium; and means operated by the steering wheel of the automobile and adapted to move said pointer.

12. In a device for indicating the course of travel of an automobile, the combination of an observation window; a plate behind said window and provided with a slot; a rotatable disc mounted adjacent said plate and having thereon an indicating medium; means driven by the propulsive mechanism of the automobile adapted to rotate said disc, the parts being so related that the movement of the disc displays the indicating medium thereon through said slot and window; a pointer pivotally mounted adjacent said window and so disposed as to be movable in unison with said indicating medium; and means operated by the steering wheel of the automobile and adapted to move said pointer.

13. In combination with a motor vehicle having a steering element, means including a movable index operated by the movement of the vehicle for automatically indicating to the operator a proper sequence of movement of the steering element adapted to cause the vehicle to move laterally into a restricted space.

14. In combination with a motor vehicle having a movable steering device, means including a movable index operated by the movement of the vehicle for automatically indicating the directions in which the steering device should be moved to produce a desired lateral displacement of the vehicle.

15. A device for assisting the lateral displacement of a vehicle through a series of forward and backward movements by indicating the various positions of the vehicle at which a change in such movements should be made, which device includes a movable element and means operated by such movements of the vehicle for actuating said element.

16. A device for assisting the lateral displacement of a vehicle through a series of forward and backward movements by indicating the various positions of the vehicle at which a change in such movements should be made, which device includes a movable element, and means relative to which the element is moved for advising the operator when the vehicle reaches one of said positions.

17. A device for assisting the lateral displacement of a vehicle through a series of forward and backward movements by indicating the various positions of the vehicle at which a change in such movements should be made which device includes a movable element, means operated by the movement of the vehicle for causing said element to travel in one direction from a fixed point, whereupon the vehicle is stopped and its direction of travel reversed and to travel in the other direction back to said fixed point, and means for stopping the travel of the element upon its return to said fixed point.

Signed by me at San Diego, Calif., this 6 day of Feb., 1933.

JAMES B. GLENNON.